(12) United States Patent
Willeke et al.

(10) Patent No.: US 9,079,530 B2
(45) Date of Patent: Jul. 14, 2015

(54) LENS BRACKET FOR ACCOMMODATING A LENS IN A HEADLAMP

(71) Applicant: HELLA KGaA, Lippstadt (DE)

(72) Inventors: Franz-Georg Willeke, Anröchte (DE); Bastian Schwarz, Lippstadt (DE); Sonja Seibt, Warburg (DE)

(73) Assignee: Hella KGaA Hueck & Co., Lippstadt (DE)

( * ) Notice: Subject to any disclaimer, the term of this patent is extended or adjusted under 35 U.S.C. 154(b) by 114 days.

(21) Appl. No.: 13/775,859

(22) Filed: Feb. 25, 2013

(65) Prior Publication Data

US 2013/0223090 A1    Aug. 29, 2013

(51) Int. Cl.
*B60Q 1/04* (2006.01)
*F21S 8/10* (2006.01)

(52) U.S. Cl.
CPC .......... *B60Q 1/0483* (2013.01); *F21S 48/1216* (2013.01); *F21S 48/147* (2013.01); *F21S 48/31* (2013.01)

(58) Field of Classification Search
CPC ...... B60Q 1/0005; F21S 48/145; F21S 48/147
USPC .......................... 362/507, 509, 520, 538, 539
See application file for complete search history.

(56) References Cited

U.S. PATENT DOCUMENTS

| | | | |
|---|---|---|---|
| 6,979,110 B2* | 12/2005 | Hasegawa et al. | 362/520 |
| 7,150,554 B2* | 12/2006 | Calderas | 362/545 |
| 8,251,559 B2* | 8/2012 | Tatsumi et al. | 362/539 |
| 2008/0176973 A1* | 7/2008 | Qiu et al. | 523/135 |
| 2010/0226142 A1* | 9/2010 | Brendle et al. | 362/512 |

* cited by examiner

*Primary Examiner* — Peggy Neils
(74) *Attorney, Agent, or Firm* — Husch Blackwell LLP

(57) ABSTRACT

A lens bracket for accommodating a lens in a headlamp and a headlamp having a lens bracket of this type, said headlamp being formed substantially by a housing made of a base body and a lens cover, and wherein the lens bracket is designed as a plastic body. It is inventively provided that the plastic body has a metal surface element which is designed in such a manner that the plastic body is protected from radiation incoming into the housing through the lens cover and entering through the lens.

10 Claims, 2 Drawing Sheets

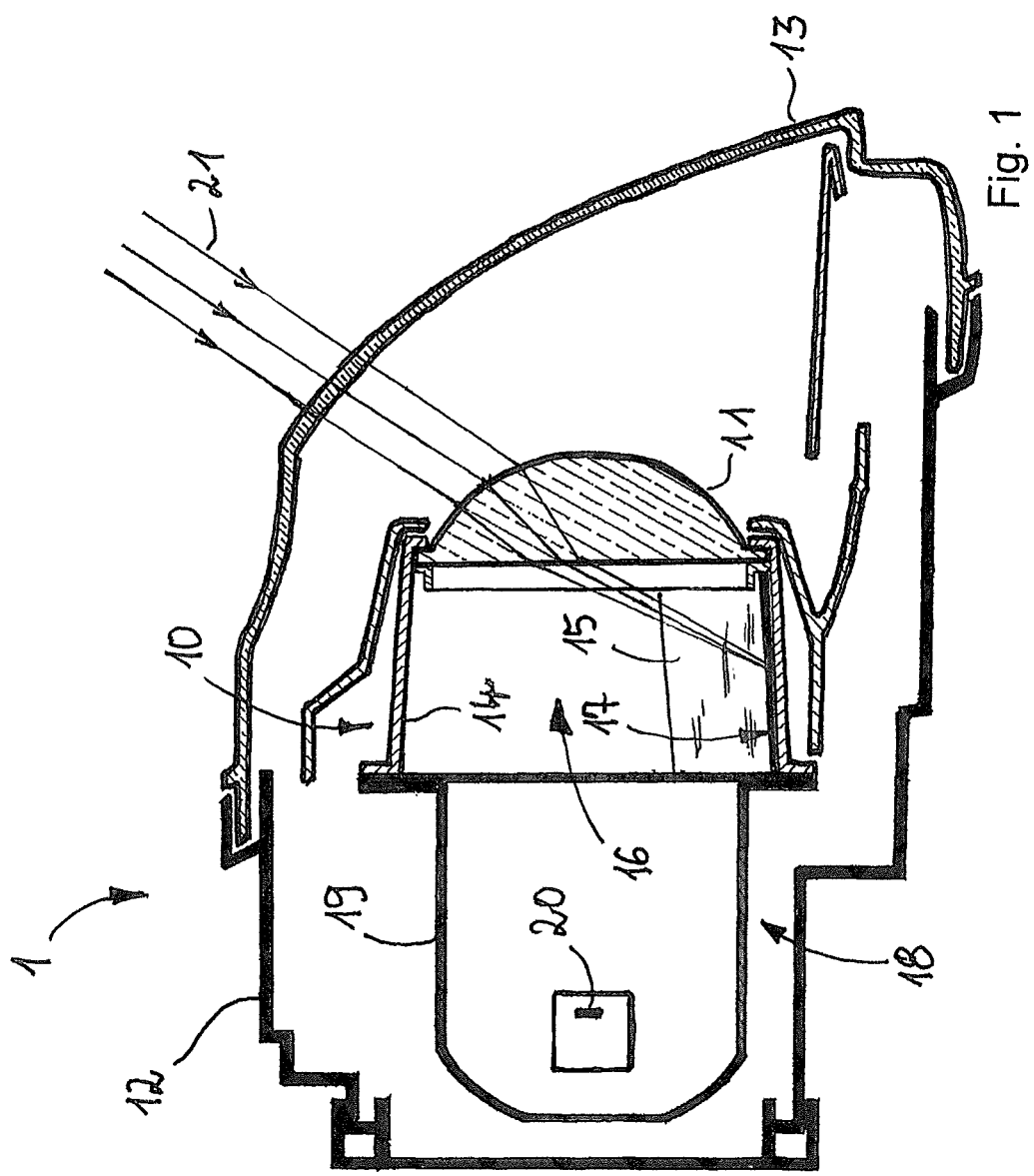

LENS BRACKET FOR ACCOMMODATING A LENS IN A HEADLAMP

CROSS REFERENCE

This application claims priority to German Patent Application No. 10 2012 101434.5, filed Feb. 23, 2012, which is expressly incorporated in its entirety by reference herein.

TECHNICAL FIELD OF THE INVENTION

The present invention relates to a lens bracket for accommodating a lens in a headlamp, said headlamp being formed substantially by a housing made of a base body and a lens cover, and wherein the lens bracket is made of a plastic body.

BACKGROUND OF THE INVENTION

In the case of headlamps, which in particular have an inclined lens cover, light rays from the sun can radiate in obliquely from above through the lens cover into the housing. A portion of the light rays from the sun can arrive through the lens and be focused by the lens on the plastic body of the lens bracket. By this means, damage to the plastic body can occur.

DE 198 03 986 A1 shows, for example, a headlamp for a vehicle, and the headlamp has a projection module with a projector lens, and the lens has a processed region in the upper region thereof, through which the radiation from the sun can arrive. The processed region can, for example, be sand blasted or stone-blasted, or a coating is provided in the upper region, wherein, due to the measures listed, a passing through of the solar radiation is prevented by the lens. Disadvantageously, during installation of the lens in the light module, the rotational position of the lens must be considered so that the processed region is located upward in the installed position of the lens. Further, the processed region is visible for an observer from the outside of the headlamp, which can be perceived as disruptive in relation to the desired appearance of the headlamp.

DE 299 12 504 U1 proposes a headlamp with a light module, in which a plano-convex lens is incorporated, and the plano-convex lens has a surface structure on the inner face, by means of which structure a scattering of sunlight incoming into the lens is generated. By this means, a focusing of the sunlight is avoided, for example, on the inner side of the lens bracket produced from plastic. Admittedly, this measure is no longer visible for an observer from the outside of the headlamp; however, the region having the altered surface structure on the face of the lens can disturb the beam path from the headlamp light in the light module.

In DE 10 2005 021 704 A1, an anti-dazzle device is proposed, and further components in the light module are screened from sunlight incoming through the lens by means of the anti-dazzle device. The shade is thereby implemented as a complex stamp-bent component and must be complexly disposed separately on a component.

SUMMARY OF THE INVENTION

The underlying problem of the invention is protecting a headlamp from incoming solar radiation in a simple way. It is in particular the object of the invention to create a protector of a lens bracket disposed in the headlamp, which lens bracket is produced from a plastic body, wherein the protection is preferably not visible from the outside of the headlamp, and in particular does not disturb the beam path of the light provided by the headlamp and is easily implemented.

This problem is solved proceeding from a lens bracket as well as a headlamp in connection with the respective characterizing features.

The invention includes the technical teaching that the plastic body has a metal surface element which is designed in such a manner that the plastic body is protected from radiation incoming into the housing through the lens cover and entering through the lens.

Inventively, the lens bracket is designed as a hybrid component, and the lens bracket consists of a base body made of plastic and a metal surface element applied at least partially to the surface of the base body. The invention thereby provides that the solar radiation can arrive through the lens, and further measures to prevent the radiation from entering through the lens are no longer necessary. If a light focusing effect does occur in the solar radiation entering through the lens, then this light focusing effect does not lead to damage of the metal surface element. The disadvantages of the prior art are surmounted as follows by using the inventive arrangement of a metal surface element on the plastic body of the lens bracket. In particular, the lens does not need to have a structured region that would be visible from outside of the headlamp, and the lens can be installed in any random rotational direction in the lens bracket. A further advantage consists in that the beam path of the light emitted by the illumination means present in the headlamp is not impaired. In order to minimize the reflection of scatter effects, the metal surface element on the plastic body forming the lens bracket can have a matte surface.

The plastic body can have an opening region in the interior thereof, in which opening region the lens can be accommodated, and the metal surface element is preferably located on one inner side of the plastic body facing the opening region. The inner side of the plastic body forms the surface that can be damaged by a focusing glass effect in conjunction with the entering solar radiation. Consequently, the metal surface element can preferably be applied at least partially to the inner side of the plastic body, which inner side faces into the opening region for accommodating the lens.

Further, the plastic body can be designed as a freeform body with a freeform contour, and the metal surface element can likewise form a freeform body corresponding to the freeform contour of the inner side of the plastic body. If the freeform contour of the metal surface element corresponds to the freeform contour of the plastic body, in that the metal surface element is to be applied on the plastic body, then the metal surface element forms a body complementary to the corresponding region of the plastic body and requires no substantial additional installation space for the arrangement on the plastic body.

As a particular advantage, the plastic body can be produced by means of an injection molding process and the plastic body can be injected on the metal surface element. For this purpose, the metal surface element can, for example, be inserted into an injection mold in order that the plastic mass can be subsequently injected into the injection mold to form the plastic body. As a result, there exists a connection between the plastic body and the metal surface element so that the lens bracket is designed as a hybrid component.

According to a further embodiment, the metal surface element can be glued, snapped in, or connected, by means of connecting means with the plastic body, to the inner side of the plastic body. For this purpose, the metal surface element can, for example, be designed as a film, but also as a dimensionally stable metal body.

The plastic body can have a section surrounding the opening region on the underside of the plastic body and the metal surface element can be applied advantageously to the inner side of the section on the underside. If the solar radiation infalls from above through the lens cover and through the lens, then a focusing glass effect occurs preferably on the underside section of the plastic body. Thus, the arrangement of the metal surface element on the underside section of the plastic body can be limited.

The invention is directed further at a headlamp having a lens bracket for accommodating a lens, having a housing which is formed substantially from a base body and a lens cover, and wherein the lens bracket is incorporated in the housing and is designed as a plastic body, and it is provided that the plastic body has a metal surface element which is designed in such a manner that the plastic body is protected from radiation incoming into the housing through the lens cover and entering through the lens. The features and advantages of the previously described lens bracket can likewise be used in an inventive headlamp having a lens bracket of this type.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 shows an embodiment of a headlamp in cross-sectional view having a lens bracket that inventively consists of a plastic body and a metal surface element.

DETAILED DESCRIPTION

Figure 3:
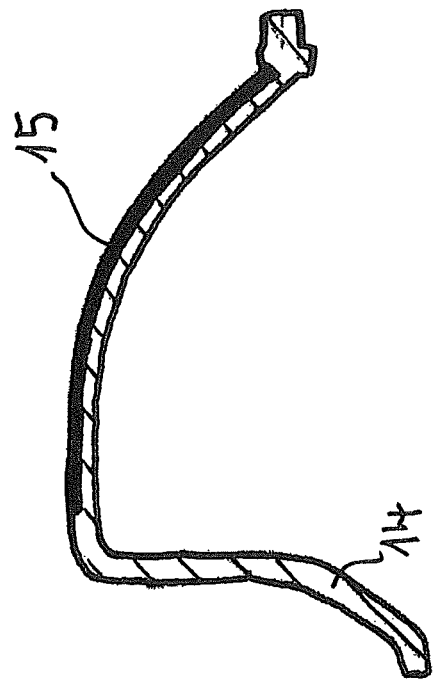
FIG. 3 shows a cross-sectional shape of a section of the plastic body having an applied metal surface element.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

FIG. 1 shows a schematic representation of a headlamp 1 which can, for example, be used for a vehicle. The headlamp 1 has a housing that is substantially formed by a base body 12 and a lens cover 13 on the front side. A light module 18 is arranged in the housing of the headlamp 1, and the light module 18 can, for example, serve for providing a low beam and/or a high beam light. The light module 18 is substantially formed by a reflector 19, an illumination means 20, and a lens bracket 10 arranged on the reflector 19, in which lens bracket a lens 11 is incorporated. The light module 18 is designed as a projection module, and when the illumination means 20 is operated and light is emitted into the reflector 19, then the light reflects at the reflector 19 and passes through the lens 11. Subsequently, the light can exit the headlamp 1 through the lens cover 13.

The lens bracket 10 has a plastic body 14 which forms the base body of the lens bracket 10, and the plastic body 14 is implemented with an opening region 16 in which the lens 11 is incorporated. The opening region 16 is limited by an inner side 17 of the plastic body 14 and a metal surface element 15 is inventively located in the lower region of the inner side 17.

For example, a solar radiation 21 is represented that irradiates in obliquely from above through the lens cover 13 and through the lens 11 to the inner side 17 of the plastic body 14. Under certain circumstances, as shown, a focusing of the solar radiation 21 can occur on the surface of the inner side 17, and the metal surface element 15 is inventively arranged on the inner side 17, which metal surface element is irradiated by the focused, yet also for example by the slightly defocused solar radiation 21. Due to the embodiment of the lens bracket 10 with a metal surface element 15 on the inner side thereof, the incoming and substantially focused solar radiation 21 cannot damage the surface of the lens bracket 10 because the metal surface element 15 is not damaged by irradiation with the focused solar radiation 21.

Figure 2:
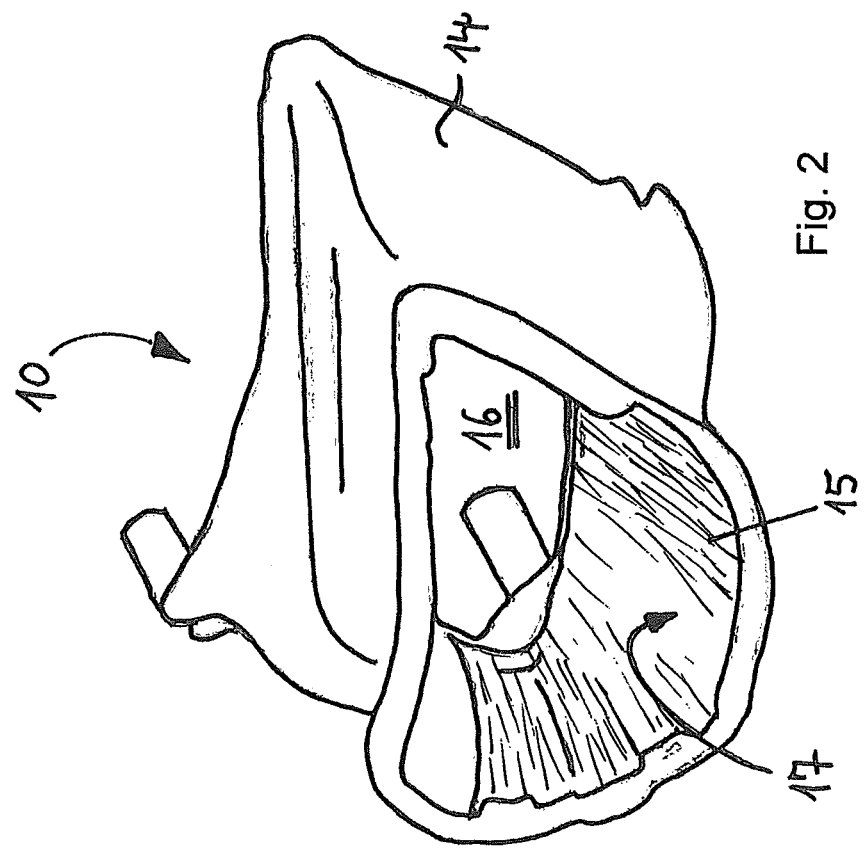
FIG. 2 shows a three-dimensional representation of a plastic body having a metal surface element for forming the lens bracket.

FIG. 2 shows a lens bracket 10 made of a plastic body 14, which bracket is produced as a freeform body by injection molding. The plastic body 14 has an opening area 16 at the inner side of the plastic body, and a metal surface element 15 is applied on the underside section of the plastic body 14 on the inner side 17 thereof. The metal surface element 15 has a freeform which corresponds to the freeform of the underside section of the inner side 17 of the plastic body 14. Consequently, the contour of the metal surface element 15 follows the contour of the inner side 17 of the plastic body 14. The metal surface element 15 is, according to the embodiment shown, insert molded by the plastic body 14, for example in that the metal surface element 15 is already inserted into an injection molding die for producing the plastic body 14 prior to the injection of the plastic mass.

FIG. 3 shows in a cross-sectional view a partial region of the plastic body 14 with an applied metal surface element 15. It is thereby conceivable that the shape of the metal surface element 15 follows the contour of the plastic body 14, and the metal surface element 15 can, for example, be implemented as a film or as a thin metal sheet.

The advantage of a lens bracket 10 implemented as a hybrid body lies in the free configurability of an injection molded plastic body 14 with a low weight. If the metal surface element 15 is merely arranged on the inner side 17 in the opening region 16 of the plastic body 14, then the lens bracket 10 does not have a large total weight, such that the headlamp 1 does not undergo any substantial addition of weight thereof due to the use of a hybrid lens bracket 10.

The invention is not limited in its implementation to the previously indicated embodiment. Rather, a number of variants is conceivable, which also make use of the solution represented in fundamentally different embodiments. All features and/or advantages, including design details or spatial arrangements, arising from the claims, the description, or the drawings can be essential to the invention in themselves and also in the most varied combinations. Within the context of the present invention, a direct connection between the metal surface element 15 at the plastic body 14 is, for example, not necessary. For example, the metal surface element 15 can also be arranged at a distance in or on the plastic body 14 without implementing the metal surface element 15 as adjoining with the plastic body 14 across the entire surface of the metal surface element. Further, the metal surface element 15 can be applied as a metal coating to the inner side 17 of the plastic body 14.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCES

1 Headlamp
10 Lens bracket
11 Lens
12 Base body of the housing
13 Lens cover
14 Plastic body
15 Metal surface element
16 Opening region
17 Inner side
18 Light module
19 Reflector
20 Illumination means
21 Radiation, solar radiation

The invention claimed is:

1. A lens bracket for accommodating a lens in a headlamp, said headlamp being formed substantially by a housing made of a base body and a lens cover, comprising:
 a plastic body forming a portion of said lens bracket and having a metal surface element configured to protect said plastic body from radiation incoming through said lens cover and entering through said lens;
 said plastic body further comprising an opening region in an interior thereof in which said lens is accommodated, wherein said metal surface element is arranged on an inner side of said plastic body facing said opening region; and
 wherein said plastic body has a section surrounding said opening region on an underside of said plastic body, wherein said metal surface element is arranged on the inner side of the section on said underside.

2. The lens bracket according to claim 1, wherein said plastic body is configured as a freeform body with a freeform contour, and wherein said metal surface element is configured with a freeform body corresponding to said freeform contour of said plastic body.

3. The lens bracket according to claim 1, characterized in that said plastic body is injection molded, and wherein said plastic body is injected onto said metal surface element.

4. The lens bracket according to claim 1, wherein said metal surface element is glued, snapped in, or connected, by means of a connecting means, with said plastic body, to an inner side of said plastic body.

5. The lens bracket according to claim 1, wherein said metal surface element is configured as a film or as a dimensionally stable metal body.

6. A headlamp having a lens bracket for accommodating a lens, comprising:
 a housing that is substantially formed of a base body and a lens cover, and wherein the lens bracket is incorporated in the housing and comprises a plastic body;
 a metal surface element in said plastic body configured to protect said plastic body from radiation incoming into said housing through said lens cover and entering through said lens;
 wherein said plastic body further comprises an opening region in an interior thereof and in which said lens is accommodated, wherein said metal surface element is arranged on an inner side of said plastic body facing said opening region; and
 wherein said plastic body has a section surrounding said opening region on an underside of said plastic body, wherein said metal surface element is arranged on the inner side of the section on said underside.

7. The headlamp according to claim 6, wherein said plastic body is configured as a freeform body with a freeform contour, and wherein said metal surface element is configured with a freeform body corresponding to said freeform contour of said plastic body.

8. The headlamp according to claim 6, characterized in that said plastic body is injection molded, and wherein said plastic body is injected onto said metal surface element.

9. The headlamp according to claim 6, wherein said metal surface element is glued, snapped in, or connected, by means of a connecting means, with said plastic body, to an inner side of said plastic body.

10. The headlamp according to claim 6, wherein said metal surface element is configured as a film or as a dimensionally stable metal body.

* * * * *